United States Patent
Ukon et al.

(10) Patent No.: US 7,977,414 B2
(45) Date of Patent: Jul. 12, 2011

(54) RADIATION-RESISTANT RESIN COMPOSITION AND RADIATION-PROOF WIRE/CABLE

(75) Inventors: Seiichi Ukon, Suzaka (JP); Hisayoshi Furukohri, Tokyo (JP); Katsuyoshi Ishida, Suzaka (JP); Joichi Kusano, Naka-gun (JP); Norio Morishita, Takasaki (JP); Osamu Takeda, Naka-gun (JP); Akira Idesaki, Takasaki (JP)

(73) Assignees: Fujikura Ltd., Tokyo (JP); Independent Administrative Institution Japan Atomic Energy Agency, Ibaraki-ken (JP)

(*) Notice: Subject to any disclaimer, the term of this patent is extended or adjusted under 35 U.S.C. 154(b) by 0 days.

(21) Appl. No.: 12/210,057

(22) Filed: Sep. 12, 2008

(65) Prior Publication Data

US 2009/0176092 A1 Jul. 9, 2009

(30) Foreign Application Priority Data

Sep. 14, 2007 (JP) ................................. 2007-239723

(51) Int. Cl.
  *C08K 5/3475* (2006.01)
  *C08K 5/3492* (2006.01)
(52) U.S. Cl. .............................. 524/91; 524/99; 524/100
(58) Field of Classification Search .................... 524/99, 524/100
See application file for complete search history.

(56) References Cited

U.S. PATENT DOCUMENTS

| | | | | |
|---|---|---|---|---|
| 6,878,761 B2 * | 4/2005 | Gugumus | ....................... | 524/91 |
| 2003/0162868 A1 | 8/2003 | Stretanski et al. | | |

FOREIGN PATENT DOCUMENTS

| | | | |
|---|---|---|---|
| JP | 01185343 A | * | 7/1989 |
| JP | 08151490 A | * | 6/1996 |
| JP | 9-12786 A | | 1/1997 |
| JP | 2608782 B2 | | 5/1997 |
| JP | 2001-164057 A | | 6/2001 |
| JP | 2003-231777 A | | 8/2003 |
| JP | 3884053 B1 | | 11/2006 |
| JP | 2007145975 A | | 6/2007 |
| JP | 2007145976 A | | 6/2007 |

OTHER PUBLICATIONS

Machine Translation of JP 08151490 A.*
Database WPI Week 200168, Thomas Scientific, London, GB, XP002510023.
Database WPI Week 200413, Thomas Scientific, London, GB, XP002510021.
"Light Reistance Stabilizer", Ciba Specialty Chemicals Ltd., 2005, [searched on Nov. 9, 2005], URL:http://tenkazai.com/ciba/syousai_taikou.html#a7_2.

* cited by examiner

*Primary Examiner* — D. Lawrence Tarazano
*Assistant Examiner* — Ricardo E Lopez
(74) *Attorney, Agent, or Firm* — Sughrue Mion, PLLC

(57) ABSTRACT

There are provided a radiation-proof resin composition that is excellent in mechanical characteristics even after exposure to harsh radiation (with 2.5 MGy), that exhibits a suitable radiation-resistant properties by a small amount of mixed additives, and that can suppress the blooming of the additives, and a radiation-resistant wire/cable. The radiation-resistant resin composition is obtained by adding 0.3 to 1.0 parts by mass of a salicylate-based UV absorber, 0.3 to 5 parts by mass of a benzotriazole-based UV absorber, and 0.3 to 5 parts by mass of a triazine-based UV absorber to 100 parts by mass of a polyolefin-based resin.

8 Claims, 1 Drawing Sheet

RADIATION-RESISTANT RESIN COMPOSITION AND RADIATION-PROOF WIRE/CABLE

BACKGROUND OF THE INVENTION

1. Field of the Invention

The present invention relates to a radiation-proof resin composition in which a salicylate-based UV absorber, a benzotriazole-based IN absorber, and a triazine-based UI absorber are added to a polyolefin-based resin, and radiation-proof wire/cable using the radiation-proof resin composition as a material of an insulator or sheath.

Priority is claimed on Japanese Patent Application No. 2007-239723, filed Sep. 14, 2007, the content of which is incorporated herein by reference.

2. Description of Related Art

Insulators and sheaths of wires and cables, resin pipes, and other resin products disposed in places where radiation exists, such as nuclear power plants, radioactive waste storage facilities, and research and medical facilities treating radioactive materials, are deteriorated due to exposure to the radiation and decrease in mechanical characteristics, thereby reaching dielectric breakdown.

For example, Japanese Patent No. 2608782 discloses a radiation-proof resin composition that is protected from radiation by adding a specific antioxidant and a salicylate-based UV absorber to a polyolefin-based resin as a resin composition for insulators and sheaths of wires and cables used in places exposed to the radiation.

For example, Japanese Unexamined Patent Publication No. 9-12786 discloses a radiation-proof resin composition that is protected from radiation by adding a specific antioxidant and a benzotriazole-based UV absorber to a polyolefin-based resin.

A benzotriazole-based UV absorber or a hindered amine-based light stabilizer is widely used to give light resistance to the polyolefin-based resin. For example, it is disclosed in the description on a specific hindered amine-based light stabilizer of "www.tenkazai.com, light-resistance stabilizer", [online], (Ciba Specialty Chemicals Ltd., 2005, [searched on Nov. 9, 2005], Internet URL: http://tenkazai.com/ciba/syousai_taikou.html#a7_2) that a synergistic effect is obtained by combination of an antioxidant and a UV absorber.

However, when the polyolefin-based resin composition employing the mire disclosed in the Japanese Unexamined Patent Publication and the Japanese Patent was exposed to radiation with 1 MGy and then was subjected to a tension test, it could be confirmed that the elongation at break was more markedly deteriorated than before the exposure and it was difficult to pass a frame test of cable. On the other hand, when the amount of mixed additives is increased so as to improve the radiation-resistant properties, there is a problem with blooming (spout of powder) of the additives.

Light resistance can be expected from the resin composition obtained by adding the combination of the benzotriazole-based UV absorber and the hindered amine-based light stabilizer to the polyolefin-based resin. However, when the resin composition is exposed to radiation and is subjected to a combustion test, the flame retardant properties thereof are more markedly deteriorated than prior to the exposure. When the amount of mixed additives is increased so as to improve the radiation-resistant properties, there is also a problem with blooming (spout of powder) of the additives.

Therefore, the invention is contrived to solve the above-mentioned problems. An advantage of some aspects of the invention is to provide a radiation-resistant resin composition that is excellent in mechanical characteristics even after exposure to harsh radiation with 2.5 MGy, that exhibits a suitable radiation-resistant property by a small amount of mixed additives, and that can suppress the blooming of the additives, and a radiation-proof wire/cable using the radiation-resistant resin composition as a material of an insulator or sheath.

SUMMARY OF THE INVENTION

According to an aspect of the invention, there is provided a radiation-resistant resin composition obtained by adding 0.3 to 1.0 parts by mass of a salicylate-based NV absorber, 0.3 to 5 parts by mass of a benzotriazole-based UV absorber, and 0.3 to 5 parts by mass of a triazine-based UV absorber to 100 parts by mass of a polyolefin-based resin.

According to another aspect of the invention, there is provided a radiation-resistant wire/cable using the above-mentioned radiation-proof resin composition as a material of an insulator or a sheath. According to the above-mentioned configuration of the invention, it is possible to provide high radiation-resistant properties to the polyolefin-based resin by adding a small amount of additives of which the blooming has been suppressed by a synergetic effect between a combination of the salicylate-based NV absorber, the benzotriazole-based UV absorber, and the triazine-based UV absorber. The mechanical characteristics thereof are maintained even after the resin composition has been exposed to harsh radiation (about 2.5 MGy). Accordingly, the radiation-proof wire/cable using the radiation-resistant resin composition and other resin products can be suitably used in places where they are exposed to radiation, such as nuclear-related facilities. When the radiation-resistant wire/cable is drawn in the presence of radiation, it is excellent in durability (drawing ability) and it is possible to prevent a deterioration of mechanical characteristics, thereby preventing, for example, falling off the sheaths at the time of removing the wires or cables.

DETAILED DESCRIPTION OF THE INVENTION

Figure 1:
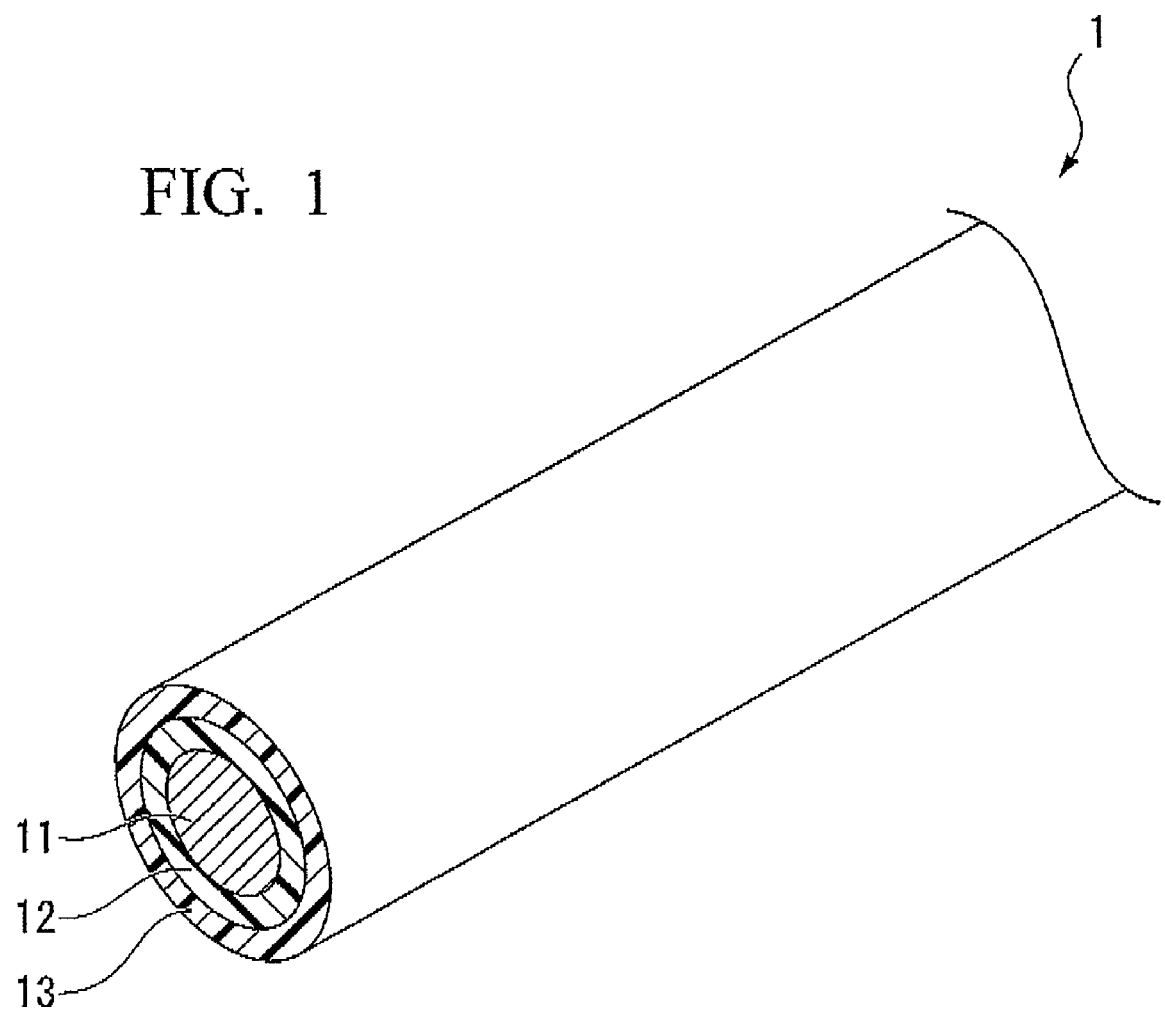
FIG. 1 is a diagram schematically illustrating a radiation-resistant cable according to an embodiment of the invention.

A radiation-resistant resin composition according to an embodiment of the invention is obtained by adding 0.3 to 1.0 parts by mass (per hundred resin) of a salicylate-based UV absorber, 0.3 to 5 parts by mass (per hundred resin) of a benzotriazole-based UV absorber, and 0.3 to 5 parts by mass (per hundred resin) of a triazine-based UV absorber to 100 parts by mass (per hundred resin) of a polyolefin-based resin.

Hereinafter, a polyolefin-based resin, a salicylate-based UV absorber, a benzotriazole-based UV absorber, a triazine-based UV absorber, metal hydrate, antioxidant, and other additives used in a radiation-resistant resin composition and a radiation-resistant wire/cable according to embodiments of the invention will be described.

Polyolefin-Based Resin

In the embodiments of the invention, it is preferable that the polyolefin-based resin include 60 to 80 parts by mass (per hundred resin) of ethylene-ethyl acrylate copolymer (EEA), 5 to 20 parts by mass (per hundred resin) of ethylene-vinyl acetate copolymer (EVA), and 10 to 20 parts by mass (per hundred resin) of α-olefin copolymer.

It is preferable that the PEA include 10 to 15 parts by mass of ethyl acrylate (EA). It is preferable that the EVA include 10 to 30 parts by mass of vinyl acetate. The α-olefin copolymer is a block polymer of a polypropylene layer and another olefin (co)polymer layer. As examples of the olefin (co)polymer, copolymers of ethylene, butylenes, and pentylene can be mentioned. It is preferable that the specific gravity of the α-olefin copolymer be in the range of 0.880 to 0.890.

In addition, the polyolefin-based resin of the invention is not limited thereto. Other polyolefin-based resins may be employed such as other ethylene homopolymers, copolymers of ethylene with vinyl acetate or ethyl acrylate, or copolymers of α-olefin excluding ethylene with vinyl monomers. Examples of the polyolefin-based resins include low-density polyethylene (LDPE), very low density polyethylene (VLDPE), high-pressure low-density polyethylene, gas-phase very low-density polyethylene, linear low density polyethylene (LLDPE), gas-phase linear low density polyethylene, medium density polyethylene (MDPE), high density polyethylene (HDPE), ethylene-propylene rubber (EPM), ethylene propylene diene rubber (EPDM), isobutylene isoprene rubber (IIR), polypropylene (PP), polybutene-1. The polyolefin-based resins above may be used by themselves or mixed with other compounds.

Salicylate-Based UV Absorber

The salicylate-based UV absorber used as an additive to the polyolefin-based resin originally has a function of absorbing UV to give light resistance. However, the salicylate-based UV absorber used in the embodiment of the invention serves to provide radiation-resistant properties to the polyolefin-based resin by a synergetic effect between the benzotriazole-based UV absorber and the triazine-based UV absorber.

It is preferable that the salicylate-based UV absorber used in the embodiment of the invention be expressed by General Formula 1:

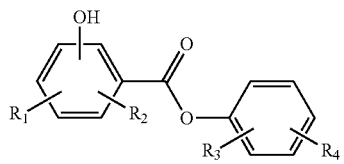

(1)

where $R_1$, $R_2$, $R_3$, and $R_4$ are independently a hydrogen atom or a straight-chain or branch-chain alkyl group with a carbon number of 1 to 10.

$R_1$, $R_2$, $R_3$, and $R_4$ are preferably a hydrogen atom or a straight-chain or branch-chain alkyl group with a carbon number of 1 to 6 and preferably a hydrogen atom or a straight-chain or branch-chain alkyl group with a carbon number of 3 to 5.

A particularly desirable example of the salicylate-based UV absorber expressed by General Formula 1 is 2',4'-di-tert-butylphenyl 3,5-di-tert-butyl-4-hydroxy benzoate.

In addition to the above-mentioned material, an example of the salicylate-based UV absorber used in the embodiment of the invention includes 4-tert-butyl-4-butylphenyl salicylate, 4-tert-butylphenyl salicylate, phenyl salicylate, amyl salicylate, menthyl salicylate, homomenthyl salicylate, octyl salicylate, 4-octyl salicylate, benzyl salicylate, dipropyleneglycol salicylate, ethyleneglycol salicylate, p-isopropanol phenyl salicylate, phenyl 2-hydroxy-3-(1-propenyl)benzoate, 2-ethylhexyl salicylate, and triethanolamine salicylate.

The amount of the salicylate-based UV absorber added to the radiation-resistant resin composition according to the embodiment of the invention is preferably 0.3 parts by mass or more with respect to 100 parts by mass of the polyolefin-based resin so as to obtain excellent radiation-resistant properties. In order to prevent the blooming from occurring, the content of the salicylate-based UV absorber is preferably 1.0 parts by mass or less with respect to 100 parts by mass of the polyolefin-based resin.

Benzotriazole-Based UV Absorber

The benzotriazole-based UV absorber used in the embodiment of the invention serves to give radiation-resistant properties to the polyolefin-based resin by a synergetic effect between the salicylate-based UV absorber and the triazine-based UV absorber.

It is preferable that the benzotriazole-based UV absorber used in the embodiment of the invention be expressed by General Formula 2:

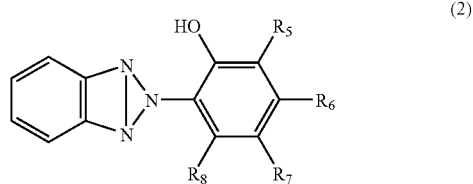

(2)

where $R_5$, $R_6$, $R_7$, and $R_8$ are independently a hydrogen atom or a straight-chain or branch-chain alkyl group with a carbon number of 1 to 10 or an alkoxy group with a carbon number of 1 to 10.

$R_5$, $R_6$, $R_7$, and $R_8$ are preferably a hydrogen atom or a straight-chain or branch-chain alkyl group with a carbon number of 1 to 6 or an alkoxy group with a carbon number of 1 to 6, and more preferably a hydrogen atom or a straight-chain or branch-chain alkyl group with a carbon number of 3 to 5 or an alkoxy group with a carbon a number of 3 to 5.

A particularly preferable example of the benzotriazole-based UV absorber expressed by General Formula 2 is 2-(3, 5-di-tert-pentyl-2-hydroxyphenyl)-2H-benzotriazole.

In addition, an example of the benzotriazole-based UV absorber used in the embodiment of the invention includes 2-(2-hydroxy-4-octyloxy phenyl)-2H-benzotriazole and 2-(2-hydroxy-5-methylphenyl)-2H-benzotriazole.

The amount of the benzotriazole-based UV absorber added to the radiation-resistant resin composition according to the embodiment of the invention is preferably 0.3 parts by mass or more with respect to 100 parts by mass of the polyolefin-based resin so as to obtain an excellent radiation-resistant properties. When the content of the benzothiazole-based UV absorber is 5 parts by mass or less with respect to 100 parts by mass of the polyolefin-based resin, it is confirmed that the blooming does not occur. The content of 5 parts by mass of more will be further studied.

Triazine-Based UV Absorber

The triazine-based UV absorber used as an additive to the polyolefin-based resin originally has a function of absorbing UV to provide the light resistance. However, the triazine-based UV absorber used in the embodiment of the invention serves to provide a radiation-resistant properties to the polyolefin-based resin by a synergetic effect between the salicylate-based UV absorber and the benzothiazole-based UV absorber.

The triazine-based UV absorber used in the embodiment of the invention includes molecules having at least a structure expressed by General Formula 3, and A in General Formula 3 is expressed by General Formula 4:

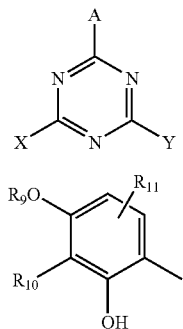

where $R_9$, $R_{10}$, and $R_{11}$ are independently a hydrogen atom, a straight-chain or branch-chain alkoxy group with a carbon number of 1 to 10, or an alkoxy group with a carbon number of 1 to 10. $R_9$, $R_{10}$, and $R_{11}$ are preferably a hydrogen atom, a straight-chain or branch-chain alkyl group with a carbon number of 1 to 6, or an alkoxy group with a carbon number of 1 to 6, and more preferably a hydrogen atom, a straight-chain or branch-chain alkyl group with a carbon number of 3 to 5, or a straight-chain or branch-chain alkoxy group with a carbon number of 3 to 5.

X and Y in General Formula 3 are independently expressed by General Formula 5 or 6.

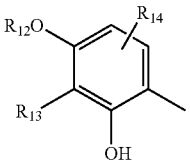

Here, $R_{12}$, $R_{13}$, and $R_{14}$ are independently a hydrogen atom, a straight-chain or branch-chain alkyl group with a carbon number of 1 to 10, or an alkoxy group with a carbon number of 1 to 10.

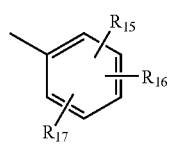

Here, $R_{15}$, $R_{16}$, and $R_{17}$ are independently a hydrogen atom, a straight-chain or branch-chain alkyl group with a carbon number of 1 to 10, or au alkoxy group with a carbon number of 1 to 10. $R_{12}$, $R_{13}$, $R_{14}$, $R_{15}$, $R_{16}$, and $R_{17}$ are preferably a hydrogen atom, a straight-chain or branch-chain alkyl group with a carbon number of 1 to 6, or an alkoxy group with a carbon number of 1 to 6, and more preferably a hydrogen atom, a straight-chain or branch-chain alkyl group with a carbon number of 3 to 5, or a straight-chain or branch-chain alkoxy group with a carbon number of 3 to 5.

The triazine-based UV absorber may have a structure expressed by General Formula 7:

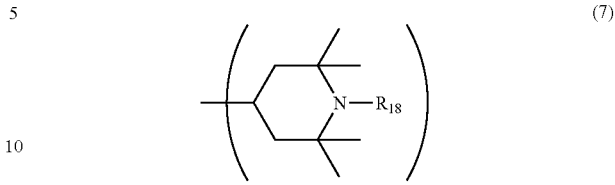

where $R_{18}$ is a hydrogen atom, a hydroxy group, a straight-chain or branch-chain alkoxy group with a carbon number of 1 to 10, or a straight-chain or branch-chain alkoxy group with a carbon umber of 1 to 10. $R_{18}$ is preferably a hydrogen atom, a hydroxyl group, a straight-chain or branch-chain alkyl group with a carbon number of 1 to 6, or a straight-chain or branch-chain alkoxy group with a carbon number of 1 to 6.

A preferable example of the triazine-based UV absorber expressed by General Formula 6 is 2-[4,6-bis(2,4-dimethylphenyl)-1,3,5,-triazine-2-yl]-5-(octyl oxy)phenol. A desirable example of the triazine-based UV absorber expressed by General Formula 7 is poly[(6-morpholino-s-triazine-2,4-diyl) [2,2,6,6-tetramethyl-4-piperidyl]imino]-hexamethylene [(2,2,6,6-tetramethyl-4-piperidyl)imino]. It is preferable that the triazine-based UV absorber expressed by General Formula 6 and the triazine-based UV absorber expressed by General Formula 7 are mixed for use.

In addition, an example of the triazine-based UV absorber used in the embodiment of the invention includes 2-(4,6-diphenyl-1,3,5-triazine-2-yl)-5-[(hexyl) oxy]-phenol and 2-[4,6-bis(2,4-dimethylphenyl)-1,3,5-triazine-2-yl]-5-(octoxy)phenol.

The amount of the triazine-based UV absorber added to the radiation-resistant resin composition according to the embodiment of the invention is preferably 0.3 parts by mass or more with respect to 100 parts by mass of the polyolefin-based resin so as to obtain excellent radiation-resistant properties. When the content of the triazine-based UV absorber is 5 parts by mass or less with respect to 100 parts by mass of the polyolefin-based resin, it has been confirmed that the blooming does not occur. The content of 5 parts by mass or more will be Per studied.

Metal Hydrate

An example of the metal hydrate used in the embodiment of the invention includes magnesium hydroxide and aluminum hydroxide. The metal hydrate may be used without any change, but it is preferable that the metal hydrate be subjected to a surface treatment such as silane coupling treatment or higher fatty acid treatment so as to enhance compatibility with the polyolefin-based resin.

The amount of the metal hydrate added to the radiation-resistant resin composition according to the embodiment of the invention is preferably 50 parts by mass or more with respect to 100 parts by mass of the polyolefin-based resin so as to obtain excellent flame retardant properties. When the content of the metal hydrate is 200 parts by mass or less, such flame retardant properties can be confirmed. The content of 200 parts by mass or more will be Per studied.

Antioxidant

The radiation-proof resin composition according to the embodiment of the invention may include an antioxidant as an additive. It is preferable that the antioxidant include a phenol-based antioxidant and particularly a hindered phenol-based antioxidant.

An example of the phenol-based antioxidant includes pentaerythrityl-tetrakis[3-(3,5-di-tert-butyl-4-hydroxyphenyl) propionate], thiodiethylene bis(3-(3,5-di-tert-butyl-4-hydroxyphenyl) propionate), octadecyl-1-(3,5-di-tert-butyl-4-hydroxyphenyl) propionate), 1,3,5-tris(3,5-di-tert-butyl-4-hydroxy benzyl)-1,3,5-triazine-2,4,6(1H, 3H, 5H)trione, isooctyl(3,5-di-tert-butyl-4-hydroxyphenyl)propionate, 1,3,5-tris(4-tert-butyl-3-hydroxy-2,6-dimethyl-benzyl)-sym-tri-azine-2,4,6(1H,3H,5H)trione, 1,3,5-triethyl-2,4,6-tris(3,5-di-tert-butyl-4-hydroxy benzyl)benzene, and tris(2,4-di-tert-butylphenyl)phosphite.

The amount of the antioxidant added to the radiation-proof resin composition according to the embodiment of the invention is preferably 0.1 parts by mass or more with respect to 100 parts by mass of the polyolefin-based resin and more preferably in the range of 0.1 to 5 parts by mass.

Other Additives

The radiation-resistant resin composition according to the embodiment of the invention may further include various assistant materials commonly used in known resin compositions as additives. Examples of the assistant materials can include a stabilizer, a filler, a coloring agent, a flame retardant carbon black, a cross-linking agent a lubricant, a treatment improver, and an antistatic agent.

Radiation-Proof Wire/Cable

The radiation-proof resin composition according to the embodiment of the invention can be used as a material of an insulator or sheath to coat a conductor using a known method, thereby producing a wire or cable as shown in FIG. 1.

EXAMPLES

Examples of the invention will be described now. Compositions and test results of radiation-resistant resin compositions according to the Examples are shown in Tables 1 and 2.

TABLE 1

| | Example 1 | Example 2 | Example 3 | Example 4 | Example 5 | Example 6 | Example 7 | Example 8 | Example 9 |
|---|---|---|---|---|---|---|---|---|---|
| EEA[1] | 60 | 70 | 75 | 80 | 75 | 60 | 60 | 60 | 60 |
| EVA[2] | 20 | 20 | 10 | 10 | 5 | 20 | 20 | 20 | 20 |
| α-olefin copolymer[3] | 20 | 10 | 15 | 10 | 20 | 20 | 20 | 20 | 20 |
| Antioxidant[5] | 1 | 1 | 1 | 1 | 1 | 1 | 1 | 1 | 1 |
| salicylate-based UV absorber[6] | 0.5 | 0.5 | 0.5 | 0.5 | 0.5 | 0.3 | 1 | 1 | 1 |
| benzotriazole-based UV absorber[7] | 0.5 | 0.5 | 0.5 | 0.5 | 0.5 | 0.3 | 1 | 3 | 5 |
| triazine-based UV absorber[8] | 0.5 | 0.5 | 0.5 | 0.5 | 0.5 | 0.3 | 1 | 3 | 5 |
| Initial mechanical characteristic — Tensile strength | ○ | ○ | ○ | ○ | ○ | ○ | ○ | ○ | ○ |
| Initial mechanical characteristic — Elongation at break | ○ | ○ | ○ | ○ | ○ | ○ | ○ | ○ | ○ |
| Elongation at break after exposure to 2.5 MGy radiation | ○ | ○ | ○ | ○ | ○ | ○ | ○ | ○ | ○ |
| Bending test after exposure to 2.5 MGy radiation | ○ | ○ | ○ | ○ | ○ | ○ | ○ | ○ | ○ |
| Blooming (spout of powder) | ○ | ○ | ○ | ○ | ○ | ○ | ○ | ○ | ○ |

| | Example 10 | Example 11 | Example 12 | Example 13 | Example 14 | Example 15 |
|---|---|---|---|---|---|---|
| EEA[1] | 60 | 60 | 60 | 60 | 60 | 60 |
| EVA[2] | 20 | 20 | 20 | 20 | 20 | 20 |
| α-olefin copolymer[3] | 20 | 20 | 20 | 20 | 20 | 20 |
| Magnesium hydroxide[4] | 50 | 100 | 150 | 200 | — | — |
| Antioxidant[5] | 1 | 1 | 1 | 1 | 0.1 | 5 |
| salicylate-based UV absorber[6] | 0.5 | 0.5 | 0.5 | 0.5 | 0.5 | 0.5 |
| benzotriazole-based UV absorber[7] | 0.5 | 0.5 | 0.5 | 0.5 | 0.5 | 0.5 |
| triazine-based UV absorber[8] | 0.5 | 0.5 | 0.5 | 0.5 | 0.5 | 0.5 |
| Initial mechanical characteristic — Tensile strength | ○ | ○ | ○ | ○ | ○ | ○ |
| Initial mechanical characteristic — Elongation at break | ○ | ○ | ○ | ○ | ○ | ○ |
| Elongation at break after exposure to 2.5 MGy radiation | ○ | ○ | ○ | ○ | ○ | ○ |
| Bending test after exposure to 2.5 MGy radiation | ○ | ○ | ○ | ○ | ○ | ○ |
| Combustion test after exposure to 2.5 MGy radiation | ○ | ○ | ○ | ○ | — | — |
| Blooming (spout of powder) | ○ | ○ | ○ | ○ | ○ | ○ |

[1] Rexpearl A1150 made by Japan Polyethylene Corporation
[2] EV270 made by Du Pont-Mitsui Polychemicals Co., Ltd.
[3] Tafmer MA8510 made by Mitsui Chemicals, Inc.
[4] Kisuma5A made by Kyowa Chemical Industry Co., Ltd.
[5] AO-60 made by Asahi Denka Co., Ltd.
[6] SEESORB712 made by Shipro Kasei Kaisha Ltd.
[7] SEESORB704 made by Shipro Kasei Kaisha Ltd.
[8] CYASORB THT 4611 made by Cytec Industries

TABLE 2

| | Example 16 | Example 17 | Example 18 | Example 19 | Example 20 | Example 21 | Example 22 | Example 23 | Example 24 | Example 25 |
|---|---|---|---|---|---|---|---|---|---|---|
| EEA[1)] | 60 | 90 | 55 | 70 | 70 | 70 | 60 | 60 | 60 | 60 |
| EVA[2)] | 20 | 5 | 20 | 30 | 0 | 25 | 20 | 20 | 20 | 20 |
| α-olefin copolymer[3)] | 20 | 5 | 25 | 0 | 30 | 5 | 20 | 20 | 20 | 20 |
| Antioxidant[5)] | 1 | 1 | 1 | 1 | 1 | 1 | 1 | 1 | 1 | 1 |
| salicylate-based UV absorber[6)] | — | 0.5 | 0.5 | 0.5 | 0.5 | 0.5 | 0.2 | 0.5 | 0.5 | 1.2 |
| benzotriazole-based UV absorber[7)] | — | 0.5 | 0.5 | 0.5 | 0.5 | 0.5 | 0.5 | 0.2 | 0.5 | 0.5 |
| triazine-based UV absorber[8)] | — | 0.5 | 0.5 | 0.5 | 0.5 | 0.5 | 0.5 | 0.5 | 0.2 | 0.5 |
| Initial mechanical characteristic — Tensile strength | ○ | X | ○ | ○ | ○ | ○ | ○ | ○ | ○ | ○ |
| Initial mechanical characteristic — Elongation at break | ○ | ○ | ○ | ○ | X | ○ | ○ | ○ | ○ | ○ |
| Elongation at break after exposure to 2.5 MGy radiation | X | ○ | ○ | ○ | ○ | ○ | ○ | ○ | ○ | ○ |
| Bending test after exposure to 2.5 MGy radiation | X | ○ | X | X | ○ | X | X | X | X | ○ |
| Blooming (spout of powder) | ○ | ○ | ○ | ○ | ○ | ○ | ○ | ○ | ○ | X |

| | Example 26 | Example 27 | Example 28 |
|---|---|---|---|
| EEA[1)] | 60 | 60 | 60 |
| EVA[2)] | 20 | 20 | 20 |
| α-olefin copolymer[3)] | 20 | 20 | 20 |
| Magnesium hydroxide[4)] | 50 | 30 | 50 |
| Antioxidant[5)] | 1 | 1 | 1 |
| salicylate-based UV absorber[6)] | — | 0.5 | 1.2 |
| benzotriazole-based UV absorber[7)] | — | 0.5 | 0.5 |
| triazine-based UV absorber[8)] | — | 0.5 | 0.5 |
| Initial mechanical characteristic — Tensile strength | ○ | ○ | ○ |
| Initial mechanical characteristic — Elongation at break | ○ | ○ | ○ |
| Elongation at break after exposure to 2.5 MGy radiation | X | ○ | ○ |
| Bending test after exposure to 2.5 MGy radiation | X | ○ | ○ |
| Combustion test after exposure to 2.5 MGy radiation | X | X | ○ |
| Blooming (spout of powder) | ○ | ○ | X |

[1)] Rexpearl A1150 made by Japan Polyethylene Corporation
[2)] EV270 made by Du Pont-Mitsui Polychemicals Co., Ltd.
[3)] Tafmer MA8510 made by Mitsui Chemicals, Inc.
[4)] Kisuma5A made by Kyowa Chemical Industry Co., Ltd.
[5)] AO-60 made by Asahi Denka Co., Ltd.
[6)] SEESORB712 made by Shipro Kasei Kaisha Ltd.
[7)] SEESORB704 made by Shipro Kasei Kaisha Ltd.
[8)] CYASORB THT 4611 made by Cytec Industries Production of Radiation-Proof Resin Composition and Cable (1) The polyolefin-based resin compositions were obtained by uniformly dispersing the compositions shown in Tables 1 and 2 by the use of a kneading machine at 170° C. (Examples 1 to 28).

(2) Press sheets with a thickness of 2 mm were produced out of the polyolefin-based resin compositions obtained in (1) under the conditions of 160° C. and 150 kgf/cm$^2$ (pressurization for 10 mixtures) by the use of a compacting machine.

(3) Agglomerated materials were obtained from the polyolefin-based resin compositions obtained in (1). Thereafter, conductors 11 of 9 mmφ were coated with cross-linking polyethylene to form insulators 12 of 12 mmφ, which were further coated with the agglomerated materials to form sheaths 13, thereby producing cables 1 of 15 mmφ (FIG. 1).

Evaluation Method
Exposure to Radiation

The press sheets produced in (2) and the cables produced in (3) were exposed to γ rays using cobalt 60 as a radiation source at a room temperature and a dose rate of 5 kGy/h to 2.5 MGy.

Evaluation of Mechanical Characteristics

The press sheets before and after the exposures to radiation were evaluated by their mechanical characteristics by the use of the following method. The press sheets were punched with a JIS3 dumbbell and were subjected to a tension test at an elongation speed of 200 mm/min, The mechanical characteristics were evaluated for tensile strength and elongation at break. Prior to the exposure of γ rays, the tensile strength of 10 MPa or more, and the elongation at break of 350% or more, which correspond to a frame resistant polyethylene sheath of "JISC 3605 '600V polyethylene cable'" was determined as acceptable (O). For those which did not reach the values above were determined as unacceptable (X). As for after the exposure of γ rays, as an indication of cracking of the sheath when winding into the diameter of the cable, the elongation at break of 50% or more was determined as acceptable (O) and the elongation at break less than 50% was determined as unacceptable (X).

Evaluation of Flame Retardancy

The cables produced in (3) before and after the exposure to radiation were subjected to a vertical tray combustion test in accordance with JIS 03521. For each cable, seven sample cables with a length of 2400 mm were used. A cable of which combustion of all of the seven sample cables which spontaneously stopped half way was determined as acceptable (O) and a cable of which one or more sample cables burnt up to the uppermost portion thereof was determined as unacceptable (X).

Blooming Test

The press sheets produced in (2) were maintained in a thermostatic bath at 50° C. for 14 days. A press sheet not having white powder generated on the surface thereof was determined as acceptable (O) and a press sheet having white powder generated on the surface thereof was determined as unacceptable (X).

Bending Test

The cables produced in (3) before and after the exposure to radiation were wound on mandrels having a diameter four times greater than the self diameter in three tuns and then were subjected to the bending test. A cable with a crack that has not reached the insulator of the cable was determined as acceptable (O) and a cable with a crack that has reached the insulator of the cable was determined as unacceptable (X).

Test Results

Examples 1 to 15

Example 1 relates to a radiation-resistant resin composition obtained by adding 0.5 parts by mass of the salicylate-based UV absorber (2',4'-di-tert-butylphenyl 3,5-tert-butyl-4-hydroxy benzoate; SEESORB712 made by Shipro Kasei Kaisya, Ltd.), 0.5 parts by mass of the benzotriazole-based UV absorber (2-(3,5-di-tert-pentyl-2-hydroxy phenyl)-2,1-benzotriazole, SEESORB704 made by Shipro Kasei Kaisya, Ltd.), 0.5 parts by mass of the triazine-based UV absorber (CYASORB THT 4611 made by Cytec Industries), and 1 parts by mass of the hindered phenol-based antioxidant (pentaerytrityl-tetrakis[3-(3,5-di-tert-butyl-4-hydroxyphenyl) propionate], tetraester type high-molecular hindered phenol; AO-60 made by Asahi Denka Co., Ltd.) to 100 parts by mass of the polyolefin-based resin obtained by mixing 20 parts by mass of an EVA resin (EV270 made by Du pont-Mitsui polychemicals) including 28% of a vinyl acetate component, 60 parts by mass of an EEA resin (Rexpearl A1150 made by Japan Polyethylene Corporation), and 20 parts by mass of a α-olefin copolymer (Tafmer MA8510 made by Mitsui Chemicals Inc.), and a radiation-resistant cable using the radiation-resistant resin composition as a sheath material. Example 2 is similar to Example 1, except that the EVA resin, the EEA resin, and the α-olefin copolymer in Example 1 were changed to 20 parts by mass, 70 parts by mass, and 10 parts by mass, respectively. Example 3 is similar to Example 1, except that the EVA resin, the EEA resin, and the α-olefin copolymer in Example 1 were changed to 10 parts by mass, 75 parts by mass, and 15 parts by mass, respectively. Example 4 is similar to Example 1, except that the EVA resin, the EEA resin, and the α-olefin copolymer in Example 1 were changed to 10 pats by mass, 80 parts by mass, and 10 parts by mass, respectively. Example 5 is similar to Example 1, except that the EVA resin, the EEA resin, and the α-olefin copolymer in Example 1 were changed to 5 parts by mass, 75 parts by mass, and 20 parts by mass, respectively. Examples 6 and 7 are similar to Example 1, except that the salicylate-based UV absorber, the benzotriazole-based UV absorber, and the triazine-based UV absorber in Example 1 were changed to 0.3 parts by mass and 1 parts by mass, respectively. Examples 8 and 9 are similar to Example 1, except that the salicylate-based UV absorber, the benzotriazole-based UV absorber, and the triazine-based UV absorber in Example 1 were changed to 3 parts by mass and 5 parts by mass, respectively. Examples 10 to 13 were obtained by adding magnesium hydroxide (Kisuma 5A made by Kyowa Chemical Industry Co., Ltd.) to Example 1 by 50 parts by mass, 100 parts by mass, 150 parts by mass, and 200 parts by mass, respectively. Examples 14 and 15 were obtained by changing the content of the antioxidant in Example 1 by 0.1 parts by mass and 5 parts by mass, respectively.

As can be clearly seen from Table 1, Examples 1 to 15 all exhibited an excellent radiation-resistant properties (mechanical characteristic and bending characteristic) and a low blooming property even after the exposure to harsh radiation (with 2.5 MGy). Examples 10 to 13 further including magnesium hydroxide by 50 to 200 parts by mass exhibited an excellent flame-retardancy. It was sufficient that the contents of the salicylate-based resin composition, the benzotriazole-based resin composition, and the triazine-based resin composition added to the olefin-based resin are 0.3 parts by mass, thereby exhibiting excellent radiation-resistant properties with a small content.

Examples 16 to 28

In Example 16, the salicylate-based UV absorber, the benzotriazole-based UV absorber, and the triazine-based UV absorber are not included from Example 1. Example 17 is similar to Example 1, except that the EVA resin, the EEA resin, and the α-olefin copolymer in Example 1 were changed to 5 parts by mass, 90 parts by mass, and 5 parts by mass, respectively. Example 18 is similar to Example 1, except that the EVA resin, the ERA resin, and the α-olefin copolymer in Example 1 were changed to 20 parts by mass, 55 parts by mass, and 25 parts by mass, respectively. Example 11 is similar to Example 1, except that the EVA resin, the EEA resin, and the α-olefin copolymer in Example 1 were changed to 30 parts by mass, 70 parts by mass, and 0 parts by mass, respectively.

Example 20 is similar to Example 1, except that the EVA resin, the EEA resin, and the α-olefin copolymer in Example 1 were changed to 0 parts by mass, 70 parts by mass, and 30 parts by mass, respectively. Example 21 is similar to Example 1, except that the EVA resin, the EEA resin, and the α-olefin copolymer in Example 1 were changed to 25 parts by mass, 70 parts by mass, and 5 parts by mass, respectively. Example 22 is similar to Example 1, except that the salicylate-based UV absorber in Example 1 was changed to 0.2 parts by mass. Example 23 is similar to Example 1, except that the benzotriazole-based UV absorber in Example 1 was changed to 0.2 parts by mass. Example 24 is similar to Example 1, except that the triazine-based UV absorber in Example 1 was changed to 0.2 parts by mass. Example 25 is similar to Example 1, except that the salicylate-based UV absorber in Example 1 was changed to 1.2 parts by mass. In Example 26, the salicylate-based LTV absorber, the benzotriazole-based UV absorber, and the triazine-based UV absorber were not included from Example 1 and 50 parts by mass of magnesium hydroxide was added thereto. In Example 27, 30 parts by mass of magnesium hydroxide was added to Example 1. In Example 28, the salicylate-based UV absorber in Example 1 was changed to 1.2 parts by mass and 50 pares by mass of magnesium hydroxide was added thereto.

As can be clearly seen from Table 2, when the contents of the resins forming the polyolefin-based resin depart from the ranges defined in the invention (Examples 17 to 21) and when the salicylate-based UV absorber, the benzotriazole-based UV absorber, and the triazine-based UV absorber were not included therefrom or the contents thereof depart from the ranges defined in the invention (Examples 16, 22 to 26, and 28), it is apparent that the advantages of the invention cannot be obtained. When the salicylate-based UV absorber, the benzotriazole-based UV absorber, and the triazine-based UV absorber are not included (Example 26), the mechanical characteristics and the flame retardancy were not improved even with the addition of magnesium hydroxide. When the content of the salicylate-based UV absorber is greater than 1 parts by mass (Examples 25 and 28), blooming occurred. When the content of magnesium hydroxide is less than 50 parts by mass, the obtained flame retardancy was not satisfactory (Example 27).

The invention is applicable to resin compositions such as insulators or sheaths of wires/cables, and is particularly suitable for use in places (sites) where radioactive materials are treated.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A radiation-resistant resin composition obtained by adding 0.3 to 1.0 parts by mass of a salicylate-based UV absorber, 0.3 to 5 parts by mass of a benzotriazole-based UV absorber, and 0.3 to 5 parts by mass of a triazine-based UV absorber to 100 parts by mass of a polyolefin-based resin, wherein
the polyolefin-based resin includes 60 to 80 parts by mass of ethylene-ethyl acrylate copolymer, 5 to 20 parts by mass of ethylene-vinyl acetate copolymer, and 10 to 20 parts by mass of α-olefin copolymer.

2. The radiation-resistant resin composition according to claim 1, wherein the polyolefin-based resin further includes 50 to 200 parts by mass of metal hydrate with respect to 100 parts by mass of a polyolefin-based resin.

3. The radiation-resistant resin composition according to claim 1, wherein the salicylate-based LTV absorber is expressed by General Formula 1:

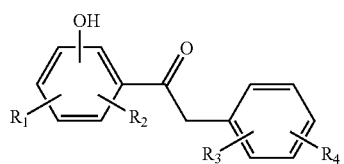

(1)

where $R_1$, $R_2$, $R_3$ and $R_4$ are independently a hydrogen atom or a straight-chain or branch-chain, alkyl group with a carbon number of 1 to 10.

4. The radiation-resistant resin composition according to claim 1, wherein the benzotriazole-based. UV absorber is expressed by General Formula 2:

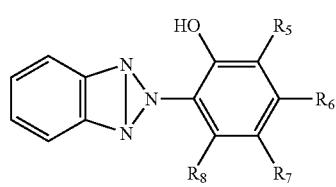

(2)

where $R_5$, $R_6$, $R_7$, and $R_8$ are independently a hydrogen atom, a straight-chain or branch-chain alkyl group with a carbon number of 1 to 10, or an alkoxy group with a carbon number of 1to 10.

5. The radiation-resistant resin composition according to claim 1, wherein the triazine-based UV absorber has at least a structure expressed by General Formula 3, A in General Formula 3 is expressed by General Formula 4, and X and Y are independently expressed by General Formula 5 or 6:

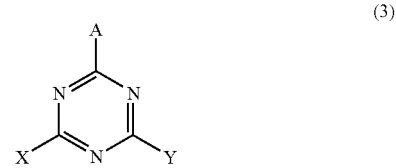

(3)

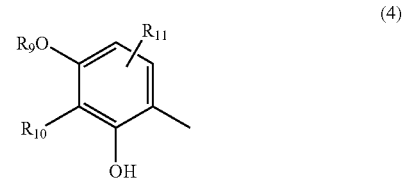

(4)

where $R_9$, $R_{10}$ and $R_{11}$ are independently a hydrogen atom, a hydroxy group, a straight-chain or branch-chain alkoxy group with a carbon number of 1 to 10,

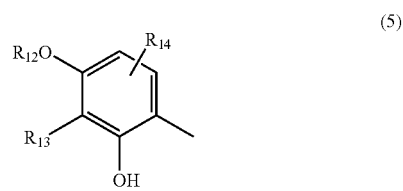

(5)

where $R_{12}$, $R_{13}$, and $R_{14}$ are independently a hydrogen atom, a straight-chain or branch-chain alkyl group with a carbon number of I to 10, or an alkoxy group with a carbon number of 1 to 10, and

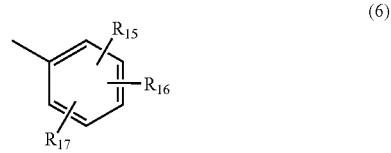

(6)

where $R_{15}$, $R_{16}$, and $R_{17}$ are independently a hydrogen atom, a straight-chain or branch-chain alkyl group with a carbon number of 1 to 10, or an alkoxy group with a carbon number of 1 to 10.

6. The radiation-resistant resin composition according to claim 5, wherein the triazine-based UV absorber further includes a structure expressed by General Formula 7, in addition to the structure expressed by General Formula 3:

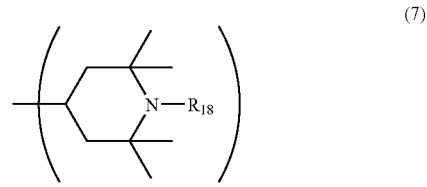

(7)

where $R_{18}$ is a hydrogen atom, a hydroxy group, a straight-chain or branch-chain alkoxy group with a carbon number of 1 to 10, or a straight-chain or branch-chain alkoxy group with a carbon number of 1 to 10.

7. A radiation-resistant-wire/cable using the radiation-proof resin composition described in claim 1 as a material of an insulator or a sheath.

8. The radiation-resistant resin composition according to claim 1, wherein the ethylene-ethyl acrylate copolymer comprises 10-15 parts by mass of ethyl acrylate;

the ethylene-vinyl acetate copolymer comprises 10-30 parts by mass of vinyl acetate; and the α-olefin copolymer has a specific gravity of 0.880 to 0.890.

* * * * *